United States Patent [19]

Tada et al.

[11] Patent Number: 5,225,449
[45] Date of Patent: Jul. 6, 1993

[54] EXPANDABLE PLASTICS AND THEIR FOAMS

[75] Inventors: Hisashi Tada, Otake; Yoshinobu Shiraishi, Nagoya; Tetsuya Sawano, Otake; Tetsuya Yamamoto; Shigeru Sakai, both of Nagoya, all of Japan

[73] Assignees: Mitsubishi Rayon Co., Ltd.; Mitsubishi Heavy Industries, Limited, both of Tokyo, Japan

[21] Appl. No.: 943,576

[22] Filed: Sep. 11, 1992

[30] Foreign Application Priority Data

Sep. 13, 1991 [JP] Japan .................................. 3-261347

[51] Int. Cl.$^5$ ................................................ C08J 9/02
[52] U.S. Cl. ...................................... 521/77; 521/149; 521/183
[58] Field of Search ................................. 521/77, 149

[56] References Cited

U.S. PATENT DOCUMENTS

| | | | |
|---|---|---|---|
| 4,139,685 | 2/1979 | Schroeder | 521/149 |
| 4,187,353 | 2/1980 | Schroeder | 521/149 |
| 4,665,104 | 5/1987 | Bitsch | 521/149 |

FOREIGN PATENT DOCUMENTS

| | | | |
|---|---|---|---|
| 0257412 | 3/1988 | European Pat. Off. | |
| 1965588 | 7/1971 | Fed. Rep. of Germany | |
| 93541 | 4/1969 | France | |
| 1045229 | 10/1966 | United Kingdom | |
| 1346676 | 2/1974 | United Kingdom | |

*Primary Examiner*—Morton Foelak
*Attorney, Agent, or Firm*—Oblon, Spivak, McClelland, Maier & Neustadt

[57] ABSTRACT

The present invention provides expandable plastics having a molecular weight of 50,000 to 500,000 which comprises the following structural units (I), (II) and (III) giving a foam having heat resistance and fine structure by heating, the molar ratio of (I+II) to (III) being 1 to 0.6-1.5 and the proportion of (I) being 5 to 50 wt. % of the total components:

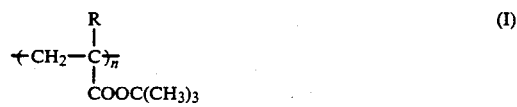

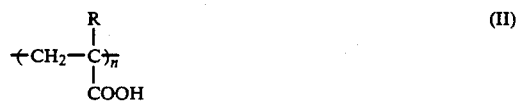

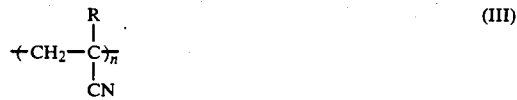

wherein R represents a hydrogen atom or a methyl group. When the copolymer, the expandable plastics, of the present invention is used, white foams having a very fine texture are obtained without using special foaming agents, and besides the heat resistance of the foams is high and the amount of water absorbed thereby is little. The foams of the present invention, therefore, can be used in a wide range as soundproofing materials and heat insulators for which the conventional foams cannot be used because of their low heat resistance, and substitutes for honeycomb structures used in airplanes.

4 Claims, No Drawings

EXPANDABLE PLASTICS AND THEIR FOAMS

BACKGROUND OF THE INVENTION

Field of the Invention

The present invention relates to expandable plastics convertible to poly(meth)acrylimide foams by heating. The term, poly(meth)acrylimide, used here refers to polymethacrylimide or polyacrylimide.

Related Art

Commercially available foamed materials used for heat insulators, soundproofing materials and the like include various foams obtained chiefly from thermoplastic resins such as polyurethane foams, polystyrene foams, polyvinyl chloride foams and the like.

On the other hand, foamed materials are recently about to be used as a core material for sandwich panels which are composite materials used as structural materials for airplanes and the like. The reason for this is that the conventionally used honeycomb structures are difficult to adhere or repair. However, foamed materials produced with conventional thermoplastic resins do not resist molding temperatures and molding pressures at the time of production of the sandwich structures.

Various investigations are now being made to improve the heat resistance and pressure resistance of the foamed materials. For example, GB 1,346,676, U.S. Pat. No. 4,187,353 and U.S. Pat. No. 4,139,685 disclose heat-resistant polyimide foamed materials produced by heating a resin plate obtained by copolymerizing (meth)acrylonitrile and (meth)acrylic acid together with a foaming agent (e.g. $C_1$-$C_4$ lower alcohols, formamide, monoformamide) at 180° to 220° C., thereby carrying out foaming and imidation at the same time. The foamed materials thus obtained are light as their density is about 0.03 to about 0.2 g/cm$^3$, and also have a heat resistance of 180° C. These materials, therefore, have a heat resistance resisting molding temperatures applied to the usual composite materials.

These foamed materials, however, have some drawbacks.

Firstly, they are very poor in water-absorbing characteristics. For example, when they are immersed in 70° C. warm water, their weight shows a remarkable increase of 460 wt. % in 50 days. This value is as very large as 10 times or more as compared with a weight increase of several ten percents observed when polyurethane foams or polyvinyl chloride foams are allowed to absorb water under the same conditions. Also, both the resins before foaming and the resulting foams are so highly hygroscopic that when they have been stored at room temperature, they need to be dried before use.

To solve this problem, U.S. Pat. No. 4,665,104 discloses foamed materials having an improved hygroscopic property. These materials are less hygroscopic, so that they can be stored under normal room temperature conditions. And also, when they are immersed in 70° C. warm water, their weight increase is 325%, which shows that they have been more improved in the water-absorbing characteristics than the conventional foamed materials. However, their water-absorbing property is still in a high level.

Secondly, these foamed materials are in a coarse and brittle condition. For example, when a bending test is carried out on sandwich panels with these foamed materials as a core material, the interface between the skin layer and foamed material is easily broken by shear.

Like the usual foamed materials, these ones are produced by polymerization with a foaming agent such as lower alcohols, formamide and the like, so that the polymerization temperature cannot be raised, which needs low-temperature, long-time polymerization conditions, for example a period of 20 to 40 hours at 40° to 60° C. This is a serious problem in terms of productivity and economy.

In order to solve the above problems of productivity and economy, the present inventors made an extensive study and as a result found that foams of high productivity and economy can be obtained by combining tert-butyl (meth)acrylate and (meth)acrylonitrile (Japanese Patent Application Kokai No. 4-170408). However, foaming is non-uniform in producing the foams so that they have drawbacks that the mechanical properties lower and the specific gravity is not uniform in the foams.

SUMMARY OF THE INVENTION

In view of the above problems, the present inventors have made an extensive study and as a result have found that by combining tert-butyl (meth)acrylate (this means tert-butyl methacrylate or tert-butyl acrylate; the same applies hereinafter), (meth)acrylic acid and (meth)acrylonitrile, high-temperature, short-time polymerization can be attained without using special foaming agents, and also foamed materials having low water-absorbing property, heat resistance and fine cells can be obtained. The present inventors thus attained to the present invention.

The present invention relates to expandable plastics having a molecular weight of 50,000 to 500,000 which comprises the following structural units (I), (II) and (III) giving a foam having heat resistance and fine structure by heating, the molar ratio of (I + II) to (III) being 1 to 0.6–1.5 and the proportion of (I) being 5 to 50 wt. % of the total components:

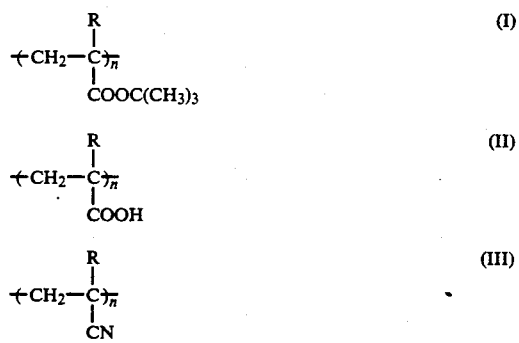

wherein R represents a hydrogen atom of a methyl group.

When the copolymer, the expandable plastics, of the present invention is used, white foams having a very fine texture are obtained without using special foaming agents, and besides the heat resistance of the foams is high and the amount of water absorbed thereby is little. The foams of the present invention, therefore, can be used in a wide range as soundproofing materials and heat insulators for which the conventional foams cannot be used because of their low heat resistance, and substitutes for honeycomb structures used in airplanes.

PREFERRED EMBODIMENTS OF THE INVENTION

The foregoing copolymer can be produced by copolymerizing polymerizable unsaturated monomers represented by the formulae (IV), (V) and (VI), $$CH_2=C(R')-COOC(CH_3)_3 \quad (IV)$$

$$CH_2=C(R')-COOH \quad (V)$$

$$CH_2=C(R')-CN \quad (VI)$$

wherein R' represents a hydrogen atom or a methyl group, in proportions that the molar ratio of (IV+V) to (VI) is 1 to 0.6–1.5 and the weight ratio of (IV) to (IV+V+VI) is 5 to 50 wt. %.

In the present invention, by using a component (IV), tert-butyl (meth)acrylate, for copolymerization, the water-absorbing property of the resulting copolymer lowers as compared with the conventional ones produced with a component (V) alone, (meth)acrylic acid. As a result, the storage stability of the copolymer improves. During the copolymerization, the side chain, —C(CH$_3$)$_3$, of the tert-butyl (meth)acrylate is decomposed by heating to generate isobutyne, which in turn acts as a foaming agent. Unlike the conventional foams, therefore, there is no need to use foaming agents such as low-boiling compounds, decomposable compounds and the like. Also, because the reaction product acts as a foaming agent, foams having a very fine foamed structure (i.e. fine cells) are obtained. Further, an imide ring is formed by heating during the copolymerization so that the foams have a high heat resistance.

Next, a method for producing the expandable plastics comprising the structural units (I), (II) and (III) of the present invention will be illustrated. In the present invention, the monomers of the formulae (IV), (V) and (VI) are used as unsaturated monomers, as described above. The feed ratio is as follows: The molar ratio of (IV+V) to (VI) is 1 to 0.6–1.5 and the component (IV) content is 5 to 50 wt. % of the total components (IV)+(V)+(VI).

When the molar ratio of (IV+V) to (VI) is larger than 1:0.6 by increase in the amounts of the components (IV) and (V), the amount of a —COOH group or acid anhydride group in the resulting copolymer or foam increases to become disadvantageous in terms of both water-absorbing characteristics and heat resistance. When the above molar ratio is smaller than 1:1.5 by increase in the amount of the component (VI), polymerization of a nitrile group, the side chain of the component (VI), increases to result in that the resulting foam is blackish or easy to become brittle. The component (IV), tert-butyl (meth)acrylate, is contained in a proportion of 5 to 50 wt. % of the total components. When this content is less than 5 wt. %, the foaming ability is not sufficient to fail to obtain lightweight foams. While when the content is larger than 50 wt. %, uniformity of foaming becomes easy to be lost.

Copolymerization of the polymerizable unsaturated monomers (IV, V and VI) is carried out by the known methods, for example, bulk polymerization at a temperature of 50° to 120° C., preferably 60° to 100° C. in the presence of a radical-forming initiator. The thickness of the copolymer can optionally be regulated, but sufficient care needs to be paid to the polymerization temperature and the amount of the initiator added taking heat generation at the time of polymerization into account. The initiator may be any of those commonly used, being optionally selected with the polymerization temperature and its amount taken into account. For example, there are given peroxides such as benzoyl peroxide, lauroyl peroxide, etc. and azo compounds such as azobisisobutyronitrile, etc. These initiators are used alone or in combination of two or more of them, but combination of two kinds of initiator having different half-life periods is preferred.

The expandable plastics thus obtained foam by heating to 180° to 240° C., and by 5 to 45-fold foaming, they give foams having a density of 0.025 to 0.23 g/cm$^3$ and as fine a texture as 10 to 20 μm in cell diameter. The foams obtained show little dimensional change even by heating at 180° C. for 2 hours, their heat resistance also being very good. The heating method for foaming may be any of the commonly employed ones, but normally, a method of heat-foaming on a press by means of any of molds having various shapes is used.

The resulting foams are used alone as heat insulators aiming at resisting heat and soundproofing materials, and in addition, are advantageously used as reinforcing fiber composite materials in which plateform foams have been impregnated with a thermosetting resin at each side, that is, structures in which materials sandwiched with prepregs have been cured.

Reinforced composite materials include carbon fiber composite materials, glass fiber composite materials, Kevlar composite materials (Kevlar is a registered trade mark of Du Pont Co.) and the like.

The present invention will be illustrated in more detail with reference to the following examples. In the examples, the polymerizable unsaturated monomers are shown by the following abbreviations:

| | |
|---|---|
| Tert-butyl methacrylate | TBMA |
| Tert-butyl acrylate | TBA |
| Methacrylic acid | MAA |
| Acrylic acid | AA |
| Methacrylonitrile | MAN |
| Acrylonitrile | AN |

EXAMPLE 1

Twenty parts by weight of TBMA, 39.7 parts by weight of MAA, 40.3 parts by weight of MAN [molar ratio:(TBMA+MAA)/MAN=1/1], 0.4 part by weight of lauroyl peroxide and 0.4 part by weight of Trigonox 29B B75 (trade name of peroxyketal produced by Kayaku Akzo Co.) were uniformly mixed. This mixture was poured into a cell composed of two pieces of glass plate placed 2 mm apart from each other and a polyvinyl chloride spacer held between the glass plates, and heated at 65° C. for 10 hours and then at 110° C. for 2 hours to obtain a transparent and uniform resin plate.

The resulting resin plate was cut into 35 mm-square pieces, put in a mold having a volume of 90 mm square×20 mm (depth) and heated at 210° C. for 2 hours to obtain a polymethacrylimide foam having a density of 0.055 g/cm$^3$. This foam is one having a very fine texture of which the cell diameter cannot visually be confirmed at all. By observation with a scanning electron microscope (produced by Nippon Denshi Co.), it was found that fine cells of 10 to 20 μm in size have been uniformly distributed through the foam.

The resulting foam of 90 mm square×20 mm (thickness) was dried by heating at 70° C. for 48 hours, after which the moisture-absorbing test was carried out under conditions of 70° C.×95% RH. After two days, absorption of moisture nearly reached saturation, showing a rise of 43 wt. % in weight. On immersing the similarly dried foam in 70° C. warm water, a weight increase of 64.3% was observed after 20 days.

COMPARATIVE EXAMPLE 1

A uniform mixture consisting of 55 parts by weight of MAA, 45 parts by weight of MAN [weight ratio:- MAA/MAN=1/1.05], 1 part by weight of formamide, 1 part by weight of isopropyl alcohol and 0.2 part by weight of tert-butyl perpivalate was heated at 40° C. for 70 hours and then at 110° C. for 20 hours in the same manner as in Example 1 to obtain a transparent resin plate.

This resin plate was heated at 210° C. for 2 hours in the same manner as in Example 1 to obtain a polyimide foam having a density of 0.05 g/cm$^3$.

The cell diameter of this foam was about 0.5 mm, which is as very large as several ten times as compared with that of the foam of the present invention, and also the unevenness of the surface of this foam was remarkable. Using this foam, the moisture-absorbing test at 70° C. and 95% RH and the water-absorbing test with 70° C. warm water were carried out in the same manner as in Example 1. As a result, it was found that the amount of moisture absorbed was 8.1 wt. % and that of water absorbed was 556.4 wt. %, which are very large as compared with those of the foam of the present invention. Particularly, the amount of absorbed water in 70° C. warm water showed as very large a value as 8.7 times.

The above results show that the copolymer of the present invention cures in a short time, and also gives a foam having a very fine texture without using special foaming agents. Further, the increase in weight by absorption of moisture or water of the foam of the present invention proves to be as low as half that of the conventional ones.

EXAMPLE 2

The foam, 90 mm square×20 mm (thickness) in size, obtained in Example 1 was dried by heating at 70° C. for 48 hours, and its dimension was measured with slide callipers. After heating at 180° C. for 2 hours, the dimension was again measured. A change in dimension of the foam before and after heating at 180° C. is shown below:

| | |
|---|---|
| Before heating: | 89.46 × 90.12 × 19.98 mm |
| After heating at 180° C. for 2 hours: | 90.34 × 90.57 × 20.14 mm |

A change in dimension by heating is 1% or less in any direction. This shows that the heat resistance at 180° C. of this foam is high, having a sufficient resistance to the curing temperature applied to composite materials used in airplanes and the like.

EXAMPLE 3 AND COMPARATIVE EXAMPLE 2

Foams were obtained by polymerization and foaming in the same manner as in Example 1 except that compositions shown in Table 1 were used as the polymerizable unsaturated monomer mixture. The density and saturated amount of absorbed moisture at 70° C. and 95% RH of the resulting foams are collectively shown in Table 1.

TABLE 1

| | Polymerizable unsaturated monomer (part by weight) | | | | | Molar ratio of monomers* | Performance of foams | | |
|---|---|---|---|---|---|---|---|---|---|
| | TBMA | TBA | MAA | MAN | AN | | Appearance | Density (g/cm$^3$) | Amount of absorbed moisture (wt. %) |
| Comparison | 67 | — | — | 3 | — | 1.00/1.04 | Non-uniform foam | 0.019 | 4.58 |
| " | 60 | — | 6.5 | 33.5 | — | 1.00/1.00 | Non-uniform foam | 0.020 | 4.69 |
| Present invention | 50 | — | 14.8 | 35.2 | — | 1.00/1.00 | Uniform foam having somewhat large cells | 0.032 | 4.80 |
| " | 30 | — | 31.4 | 38.6 | — | 1.00/1.00 | Uniform white foam | 0.043 | 4.21 |
| " | 30 | — | 30.0 | 40.0 | — | 1.00/1.07 | Uniform white foam | 0.045 | 4.31 |
| " | 20 | — | 35.0 | 45.0 | — | 1.00/1.23 | White foam having a fine texture | 0.056 | 4.15 |
| " | 10 | — | 47.9 | 42.1 | — | 1.00/1.00 | White foam having a fine texture | 0.067 | 4.10 |
| Comparison | 3 | — | 58.7 | 43.3 | — | 1.00/1.00 | Poor foaming | | |
| " | 30 | — | 20.0 | 60.0 | — | 1.00/2.40 | Yellow foam | 0.054 | 3.98 |
| " | 20 | — | 54.2 | 25.8 | — | 1.00/0.5 | Uniform white foam | 0.059 | 3.06 |
| Present invention | — | 50 | 13.1 | 36.9 | — | 1.00/1.01 | Uniform white foam having somewhat large cells | 0.033 | 4.25 |
| " | — | 30 | 30.3 | 39.7 | — | 1.00/1.01 | Uniform white foam | 0.048 | 4.11 |
| " | — | 20 | 39.1 | 40.9 | — | 1.00/1.00 | Uniform white foam having a fine texture | 0.051 | 4.20 |
| " | — | 10 | 47.6 | 42.4 | — | 1.00/1.00 | Uniform white foam | 0.064 | 4.10 |
| " | 40 | — | 27.8 | — | 32.2 | 1.00/1.00 | Uniform white foam | 0.040 | 4.20 |
| " | 20 | — | 44.8 | — | 35.2 | 1.00/1.00 | Uniform white foam having a fine texture | 0.058 | 4.31 |
| " | — | 40 | 26.8 | — | 33.2 | 1.00/1.00 | Uniform white foam having a fine texture | 0.041 | 4.32 |
| " | — | 20 | 44.3 | — | 35.7 | 1.00/1.00 | Uniform white foam having a fine texture | 0.056 | 4.40 |
| Comparison | — | — | 56.1 | 43.9 | — | 1.00/1.00 | No foaming | | |
| " | — | — | 61.8 | — | 38.2 | 1.00/1.00 | No foaming | | |

As shown above, when the composition of the monomers is in the range determined by the present invention, white and uniform foams having a fine texture are obtained and also their water-absorbing property is good. When the above composition is outside the range determined by the present invention, there are drawbacks that foaming becomes nonuniform, foams are colored and the degree of water absorption becomes high. Consequently, the composition of the present invention proves to be advantageous.

EXAMPLE 4

Using the resin plate copolymerized in Example 1, foaming was carried out in completely the same manner as in Example 1 except that the depth of the mold for foaming was changed to 10 mm and 15 mm. The density of the resulting foams was 0.106 and 0.076 g/cm³, each foam being a uniform one having a very fine texture. As described above, when the resin plate of the present invention is used, foams of different densities can simply be obtained by merely changing the foaming method, which is a great advantage in terms of production.

What is claimed is:

1. Expandable plastics having a molecular weight of 50,000 to 500,000 which comprises the following structural units (I), (II) and (III) giving a foam having heat resistance and fine structure by heating, the molar ratio of (I+II) to (III) being 1 to 0.6-1.5 and the proportion of (I) being 5 to 50 wt. % of the total components:

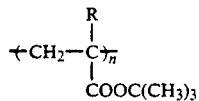 (I)

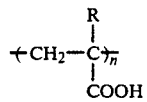 (II)

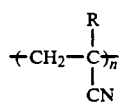 (III)

wherein R represents a hydrogen atom or a methyl group.

2. Foams obtained by heating the expandable plastics according to claim 1 at 180° to 220° C.

3. Foams containing no special foaming agents and having heat resistance and a fine structure obtained by heating a copolymer which is obtained by polymerizing a polymerizable unsaturated monomer mixture comprising polymerizable unsaturated monomers represented by the following formulae (IV), (V) and (VI), the molar ratio of (IV+V) to (VI) being 1 to 0.6-1.5 and the proportion of the monomer (IV) being 5 to 50 wt. % of the total components:

$$CH_2=C(R')—COOC(CH_3)_3 \qquad (IV)$$

$$CH_2=C(R')—COOH \qquad (V)$$

$$CH_2=C(R')—CN \qquad (VI)$$

wherein R' represents a hydrogen atom or a methyl group.

4. Foams according to claim 3 obtained by heating the copolymer at a temperature of 180° to 220° C.

* * * * *